United States Patent [19]
Wolff

[11] 3,787,619
[45] Jan. 22, 1974

[54] WIDE ANGLE DISPLAY SYSTEM
[75] Inventor: Hanns H. Wolff, Orlando, Fla.
[73] Assignee: The United States of America as represented by the Secretary of the Navy, Washington, D.C.
[22] Filed: June 7, 1972
[21] Appl. No.: 260,616

[52] U.S. Cl............................ 178/6.8, 178/DIG. 35
[51] Int. Cl. .............................................. H04n 7/00
[58] Field of Search 178/7.3 R, 7.3 DC, 6.8, DIG. 6, 178/DIG. 35

[56] References Cited
UNITED STATES PATENTS
3,612,761  10/1971  Wolff.......................... 178/DIG. 35

Primary Examiner—Richard Murray
Attorney, Agent, or Firm—R. S. Sciascia; J. W. Pease; H. A. David

[57] ABSTRACT

A wide angle display system wherein a wide angle background scene has a hole cut therein to receive a narrow angle computer generated insert picture. The necessary blanking signals are computed and generated for each wide angle field based on the narrow angle picture data for the immediately preceding field.

9 Claims, 5 Drawing Figures

WIDE ANGLE DISPLAY SYSTEM

BACKGROUND OF THE INVENTION

This invention relates to wide angle television display systems and more particularly to the art of forming a composite display picture by inserting into a background scene derived from a first source, usually a television camera, an image of a subject which is to appear as if it were actually in the presence of the background. Often wide angle visual displays are used in conjunction with training devices such as flight simulators, aircraft carrier landing trainers, and the like. While a wide angle (say 180°) background display of a background scene can be generated by existing T.V. projection techniques with good enough resolution for that purpose, satisfactory training often requires wide angle displays which contain a relatively narrow or small display area of high resolution as compared to the remainder of the display.

Composite display techniques have included simple simultaneous superposition of the narrow angle subject matter onto the wide angle background, alternate frame showings of background and inserted matter, and blanking a portion of the background video so as to "cut out" a "hole" in the background display into which the narrow angle display is inserted. The superposition and the alternate frame techniques have the advantage of permitting the insert to be placed anywhere within the background scene without the necessity of generating blanking signals to cut a hole therein, and the disadvantage of a bleed-through effect unless the narrow angle matter is all of sufficient brightness to effectively blot out the background accompanying the same area. Accordingly, these two techniques are only suitable for two or three dimensional narrow angle subjects which are capable of bright illumination throughout the narrow angle to be displayed. The third, or hole-cutting technique as it has been practiced heretofore has relied upon viewing of the insert matter directly by a separate camera or through a beam splitting mirror to provide blanking signals for the background video. One example of such is shown in my U.S. Pat. No. 3,612,761. The insertion method as described in that patent is, however, essentially limited to the insertion of two or three-dimensional pictures or models as high resolution data sources.

Now, it is desirable to be able to provide an insertion technique which is not restricted to two or three-dimensional data sources but can be used for insertion of computer generated images of the television scanning line type. The ability of computers to provide television pictures, in color, which are sufficiently realistic in appearance to be useful in training has been demonstrated, for example in simulated docking of spacecraft. In other simulation situations, for example in the case of training pilots in making aircraft carrier landings, it would be advantageous to project a wide angle background display with one television projector and to project a narrow angle, computer generated insert display with a second television projector which is dirigible so as to move the inserted display to any position within or partially within the wide angle display.

SUMMARY OF THE INVENTION

With the foregoing in mind, it is a principal object of this invention to provide improved methods and apparatus for generating wide angle visual displays which contain a relatively small display area which may be of higher resolution than the background area.

Another important object of this invention is the provision of methods and apparatus for forming a composite visual display comprising a wide angle background portion projected by a first or wide angle T.V. projector, and a narrower angle, computer generated insert portion projected by a second or narrow angle projector which is dirigible to any location within or partially within the background display.

Another object of the invention is to provide an improved manner of generating background hole-cutting blanking signals which does not require an actual three-dimensional model or two-dimensional picture as the insert data source. Rather, the invention contemplates the use of a computer generated insert data and computer and blanking signal generating means wherein each field of the narrow angle display is stored and analyzed to compute the shape and location of a cut-out in the immediately following wide angle field, which cut-out will accurately accept the insert even though the wide and the narrow display rasters are different.

The invention may further be said to reside in certain novel combinations, arrangements of cooperating elements and steps by which the foregoing objects and advantages are achieved as well as others which will become apparent from the following detailed description of presently preferred embodiments thereof.

DESCRIPTION OF THE PREFERRED EMBODIMENT

Figure 1:
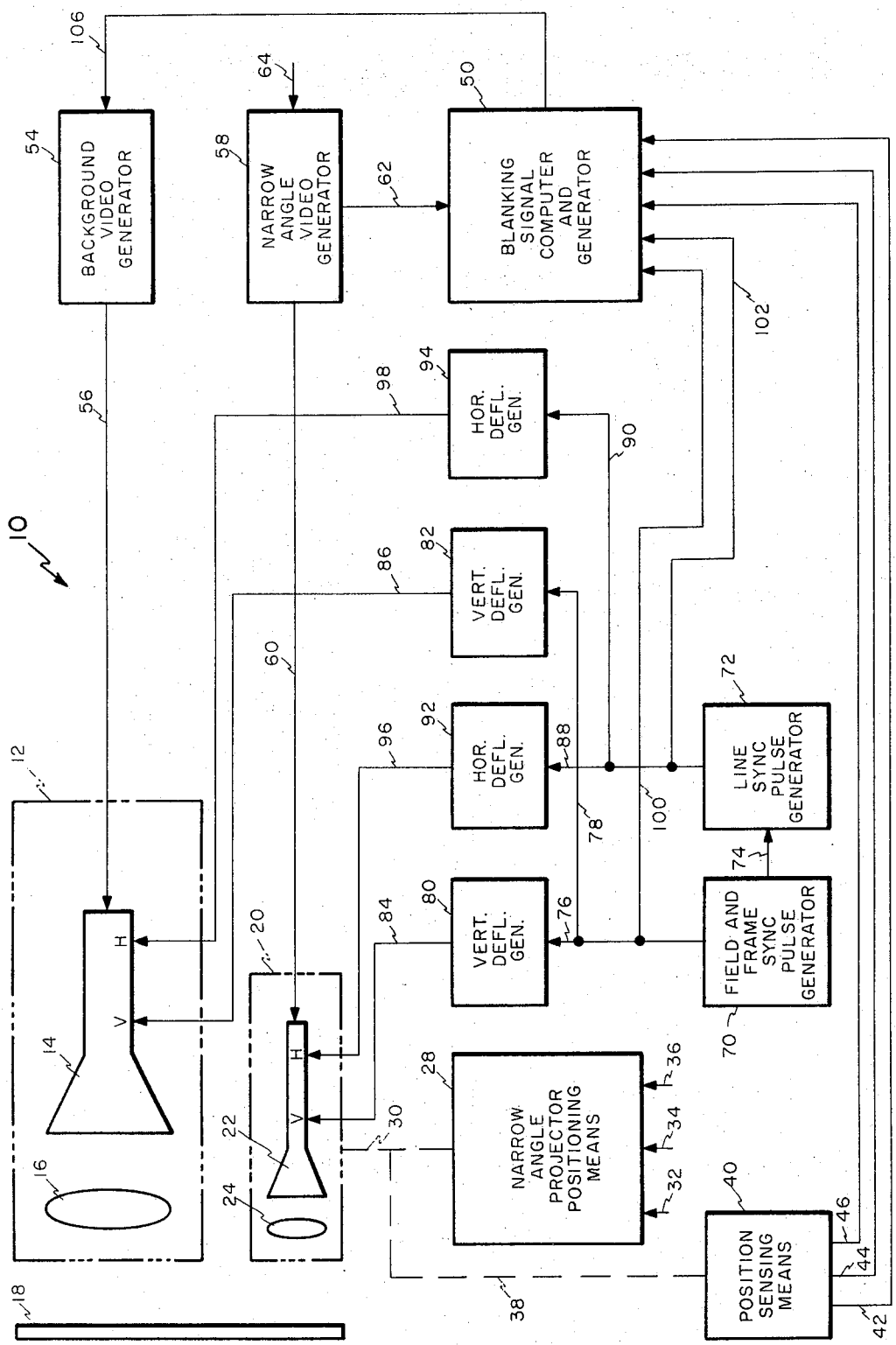
FIG. 1 is a diagrammatic illustration in block form of a wide angle display system embodying the invention.

In the exemplary form of the invention illustrated in the drawings and described hereinafter, a composite narrow angle and wide angle display system, indicated generally at 10 in FIG. 1, comprises a wide angle television projection means 12 including one or more scanning devices such as a cathode ray tube means 14 having horizontal and vertical beam deflection means and suitable optics 16 for casting a wide angle television image as background on a screen 18. The screen 18 is preferably a curved screen either cylindrical or spherical as the use indicates, and the projection means 12 may be of any of the various ones known in the art some of which can provide a background scene covering 180° or more in azimuth and 60° or more in elevation.

The display system 10 further comprises a relatively narrow angle television projection means 20 including a scanning device such as a cathode ray tube 22 having horizontal and vertical beam deflection means and suitable optics 24 for casting a narrow angle television image as an insert to the scene on the screen 18. The size of the insert is not material, but for purposes of example consider the insert projection area to extend 30° vertically and say 45° in width. It is preferable, but not necessary to some embodiments of the invention, that both the wide angle projection means 12 and the narrow angle projection means 20 be operated at the same field and frame rate. It is also preferable to use for both wide and narrow displays the same number of lines per frame, or to use for the narrow angle display an integral multiple of the number of wide angle display lines per frame.

The narrow angle projection means 20 is supported for movement, for example in azimuth, elevation, and if desired in rotation by positioning means 28 mechanically coupled to that projection means as indicated by the dotted line 30. The positioning means 28 may be of any suitable construction such as synchro means driven in accordance with programmed inputs or non-programmed inputs such as might be derived from a flight trainer or the like with which the system 10 may be associated to provide visual simulation.

Such trainers are well known in the art and need not be described here. Suffice it to say that the inputs represented by lines 32, 34, 36 to the positioning means may include any or all of the mentioned azimuth and elevation (if necessary also rotational) degrees and serve to move the insert with respect to the background display in to the proper location for providing realism to a trainee. Thus, the insert might consist of a presentation of an aircraft carrier, the position and aspect of which will change relative to the simulated cockpit as the trainee makes an approach.

Movements of the projection means 20 are transmitted by mechanical means indicated by dotted line 38 to position sensing means 40 for conversion to signals representative of azimuth, elevation and (if used) rotation, which signals are applied as shown by lines 42, 44, and 46 to a blanking signal computer 50, the operation of which will be described more fully hereinafter. The sensing means 40 may, for example, comprise potentiometer means or shaft angle digital encoder means to provide signals representative of the vertical and horizontal components of the insert position relative to the background.

Background video signals are generated by a background video generator 54 and fed as shown by line 56 to the wide angle projection means 12. The background video generator may comprise any of the well known expedients for generating video including tape playback means, a television camera viewing an analog transparency, e.g. of a seascape, a three-dimensional model, or the like, but preferably comprises means for providing a computer generated background image.

A narrow angle detailed picture insert video generator 58 provides video signals as indicated via line 60 to the narrow angle projector 20 and via line 62 to the blanking signal computer 50. The video generator 58 in this example utilizes a digital computer storage device as information storage and further comprises computer means capable of generating from analog problem input data, such as distance, aircraft and ship headings, relative bearings, aircraft altitude, speed, and the like derived from the flight trainer, the video signals necessary to produce pictures, which may be in color. In the present example we will consider the insert pictures to be computer generated views of an aircraft carrier. The input data to the generator 58 is represented collectively by line 64. In any event, the particular form that the narrow angle video signal generator 58 takes is not critical to the invention other than that it utilizes line scanning.

The computer means of the video generator 58 may be any of the prior art devices capable of performing the functions described. Such computer means are well known and their functional interrelationships and structural interconnections with the invention will be obvious to those skilled in the art having knowledge of applicant's disclosure. The article titled "Computer Displays" by Ivan E. Sutherland, published in the June, 1970 issue of the "Scientific American," pages 57 – 81, describes computer means and television apparatus suitable for implementing video generator 58 of FIG. 1. For example, the figure on page 60 of the article shows a basic arrangement of a digital computer connected to control a cathode ray tube display through suitable digital to analog converters and timing circuits. The figures on pages 66 and 67 illustrate systems adapted for use with the invention which have inputs from control stations of the type employed in training devices. Pages 58 and 59 show pictures generated by a commercial I.B.M. 1130 digital computer on an I.B.M. 2250 display. Pages 70 and 71 show numerous views of a computer generated picture of an aircraft carrier displayed on a television monitor. Volume I of "The Computer Display Review," 1969, published by the GML Corporation, Lexington, Massachusetts, shows several computer controlled display systems which are commercially available and suitable for use with the invention.

Another system of computer generated imagery, suitable for use with the subject invention, is found in an article by Mr. G. Gilliland of General Electric Company at pages 175 through 180 of Naval Training Device Center report IH-206 reporting on an industry conference of Feb. 15–17 of 1972, and available from the National Technical Information Service, Department of Commerce, Springfield, Va. under call number AD737226.

A field and frame sync pulse generator 70 and a line sync pulse generator 72 are provided which are linked to each other via line 74. The field and frame sync pulse generator 70 provides sync pulses via lines 76 and 78 to vertical deflection signal generators 80 and 82 which respectively provide vertical deflection signals via lines 84 and 86 to the projection means 20 and 12. Similarly, the line sync pulse generator 72 provides sync pulses via lines 88 and 90 to horizontal deflection signal generators 92 and 94 which respectively provide horizontal deflection signals via lines 96 and 98 to the projection means 20 and 12. The sync pulse outputs of the generators 70 and 72 are further applied via lines 100, 102 to the blanking signal generator 50. The deflection generators 80 and/or 82, and 92 and/or 94 may contain delay means to achieve coincidence of first field of one display with the interlace field of the other.

The blanking signal computer and generator 50 utilizes the position signal inputs via lines 42 and 44, (if rotation is involved, also 46) the narrow angle video input via line 62, and the sync signal inputs via lines 100, 102 to compute and generate appropriate blanking signals to cut a properly shaped and positioned hole in the background display to accommodate the narrow angle insert display. The blanking signal output of the generator 50 is applied as indicated by line 106 to the background video generator 54. While it is feasible to include computation in the blanking signal computer and generator 50 to account for rotation of the projection means 20, if at all needed, it is generally more expedient to accomplish the rotational factor by presently known electronic raster rotation means in response to a portion of the inputs 64 thereto. By so doing, the mechanization for rotation of the projection means 20 can be eliminated as well as substantial additional computation in the computer and generator 50.

Figure 2:
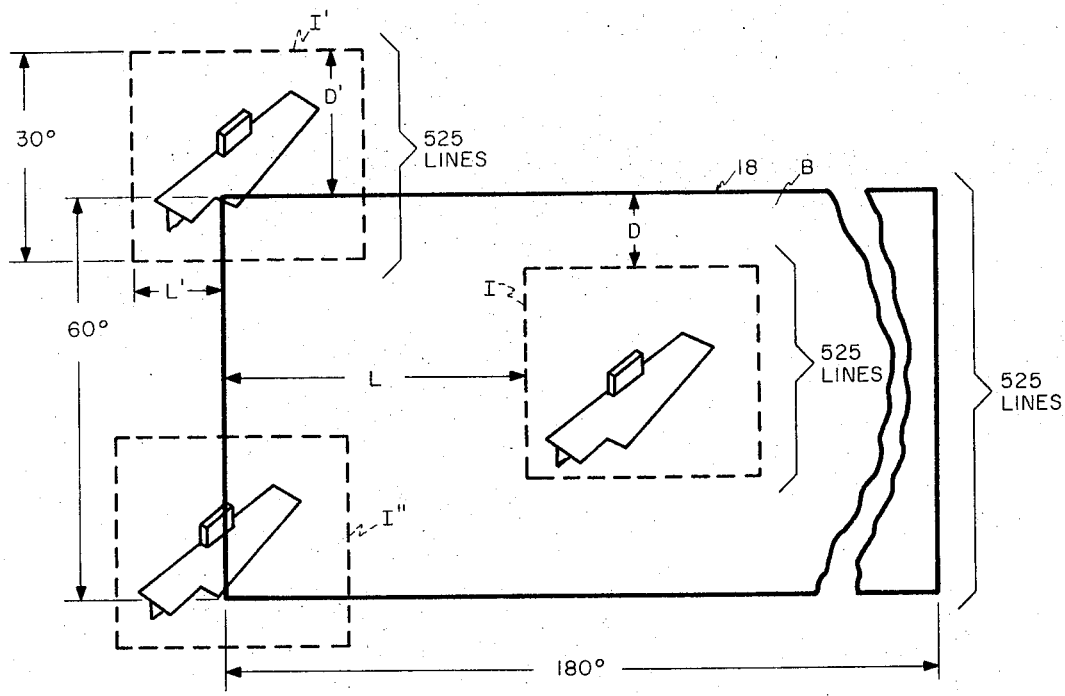
FIG. 2 is a diagrammatic illustration of a display screen shown different positions for narrow angle picture insertion.

The blanking signal computer and generator 50 must take into account (1) the fact that the linear speed of a sweep line of the wide angle display will be greater than that of a sweep line of the narrow angle display, (2) the fact that the narrow angle display will usually have more lines per vertical increment of display screen than will the wide angle display, and (3) the delays necessary to position the cut out in accordance with the position of the narrow angle projector. These factors can more readily be appreciated by reference to FIG. 2 wherein a wide-angle background display B is 180° wide, 60° high and is made up of 525 scan lines, and a narrow angle insert display area I is 45° wide, 30° high, and is also made up of 525 lines. The number of lines need not be the same, the number given merely being one readily available. Because the narrow angle projection area is smaller it will be apparent that although the number of lines is the same the resolution available in the small area I will be a number of times better than for the wide angle area B. It will also be apparent that the linear velocity or speed of scan across the screen 18 will be considerably greater for the wide angle display B than for the narrow angle display area I.

The narrow angle display area may assume a position wholly within the background area, as at I, or only partially within the area of the background B, as shown at I', I''.

Information for a set of blanking signals is accumulated during each field of the narrow angle display for use in generating the necessary blanking signals for cutting a hole the exact shape and size of the aircraft carrier view in the immediately following field of the wide angle display. An example will now be given of a suitable blanking signal computer and generator 50 for accomplishing the foregoing.

Figure 3:
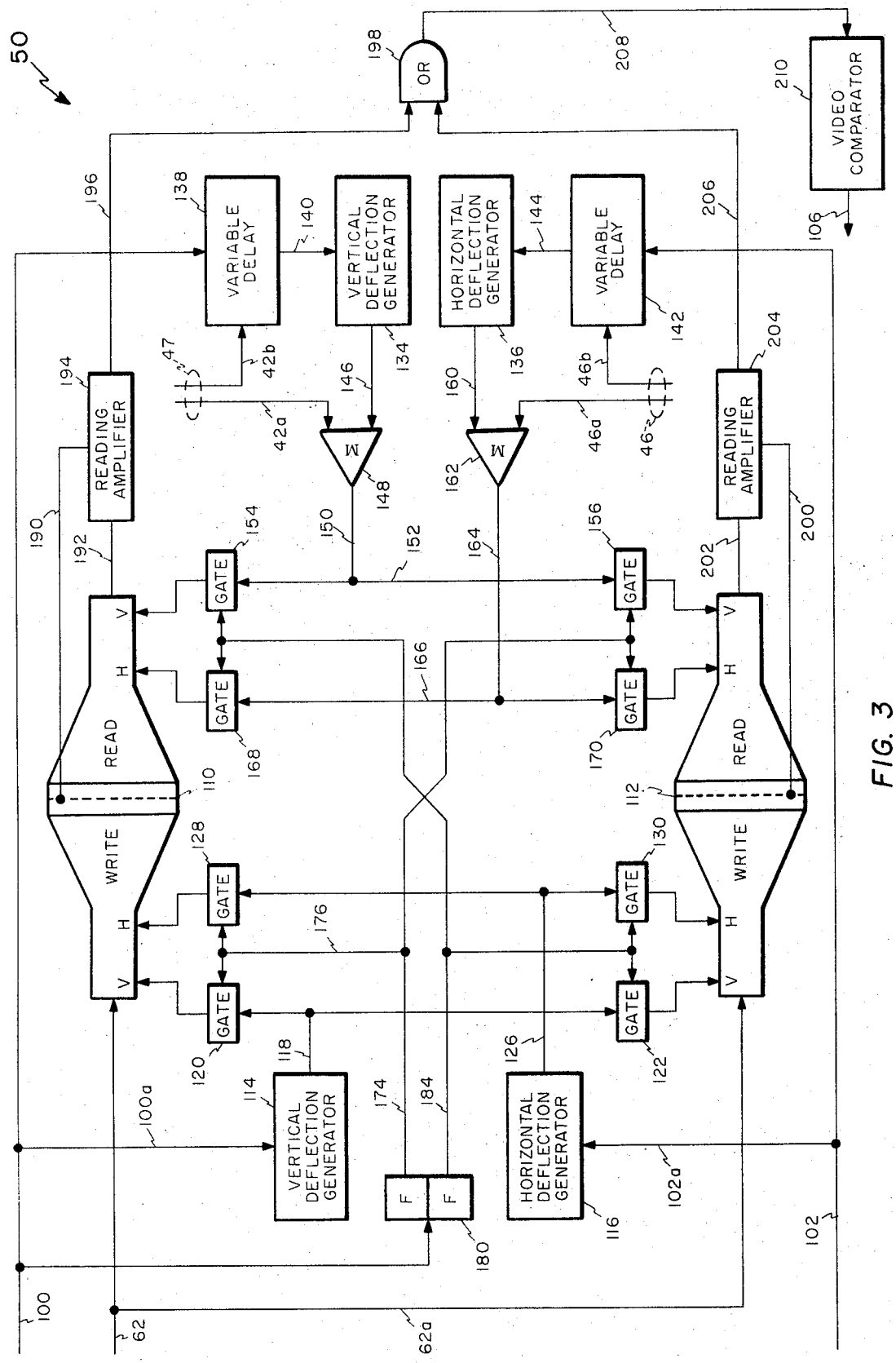
FIG. 3 is an illustration in block form of the blanking signal computer and generator portion of the system of FIG. 1.

Referring to FIG. 3, the computer and generator 50 comprises first and second scan conversion (Graphecon) tubes 110 and 112, the writing inputs of which are connected to receive the narrow angle video as shown by lines 62, 62a. Vertical and horizontal deflection generators 114 and 116 are respectively connected to receive frame and field sync pulses via lines 100, 100a and line sync pulses via lines 102, 102a. The generator 114 serves to generate vertical deflection signals on line 118 which is coupled via a gate 120, when enabled, to the vertical deflection means of the write side of the tube 110 and via a gate 122, when enabled, to the vertical deflection means of the write side of the tube 112. Similarly, the generator 116 serves to generate horizontal deflection signals on line 126 which is coupled via a gate 128, when enabled, to the horizontal deflection means of the write side of the tube 110 and via a gate 130, when enabled, to the horizontal deflection means of the write side of the tube 112.

The "read" sections of the scan conversion tubes 110, 112 are provided with vertical and horizontal deflection signals derived from a vertical deflection generator 134 and a horizontal deflection generator 136. These generators, 134 and 136, are operated to provide deflection signals for the reading beams of the tubes 110, 112 which will cause those beams to scan the storage elements of the tubes in the same manner as the wide angle projection means scans the portion of the screen 18 on which the narrow angle projection area I is located. The manner in which this is done, and the purposes of this feature will be made apparent as the description proceeds.

The sync pulses on line 100 are applied via a variable time delay means 138 and line 140 to the vertical deflection generator 134, while the sync signals on line 102 are applied via a variable time delay means 142 and line 144 to the horizontal deflection generator 136. The variable delay means 138 is controlled by an input signal thereto represented by line 42b from the narrow angle projector position sensing means 40. This input signal is in the form of an analog voltage corresponding to the amount D by which the top of the narrow angle projection area I is below the top of the wide angle projection area B. When the distance D is zero or negative (as when the narrow projection area is in the position I') no delay is introduced by means 138. As the distance D increases the delay introduced by means 138 increases proportionately. The output of the vertical deflection generator 134 is fed via line 146, a summing amplifier 148, lines 150, 152, and gates 154 and 156 when enabled, to the vertical deflection means of the read sections of tubes 110 and 112.

The summing amplifier 148 has as its other input an analog voltage level, represented by line 42a, from the narrow angle projector position sensing means 40. This input is representative of the distance D' by which the top of the narrow angle display is above the top of the wide angle display area B if it is indeed above the top thereof as shown at I'.

The gates 120, 128, 156, and 170 are connected as shown by lines 174, 176 to be simultaneously enabled by one condition of a flip-flop 180, whereas the gates 122, 130, 154, and 168 are connected as shown by lines 184, 186 to be simultaneously enabled by the other condition of the flip-flop 180. The flip-flop 180 is connected to receive the field sync pulses from line 100 via line 100b and to be driven so as to alternate between its operative conditions with each field alternation of the system.

The read section of the tube 110 is connected as shown by lines 190, 192 to a reading amplifier 194, the output of which on line 196 is applied to OR gate means 198. Similarly, the read section of the tube 112 is connected as shown by lines 200, 202 to a reading amplifier 204, the output of which on line 206 is applied to the OR gate means 198.

The output of the OR gate means 198 is fed as shown by line 208 to a video comparator circuit 210 the output of which consists of the necessary blanking signals on line 106.

In operation of the system 10 it will be appreciated that if, for example, each of the displays utilizes 525 lines per frame with a two field-interlace, each field will consist of 262.5 lines. It will also be appreciated that the narrow angle area I will be swept by only 131.25 wide angle lines per field and that the linear sweep speed of those wide angle lines will be such as to complete the traverse of that area I in one fourth the time required for a full line of wide angle display. Accordingly, the horizontal deflection generator 136 generates a modified saw tooth deflection signal 212 (FIG. 4) required for full deflection of the reading beams of the tubes 110, 112 and has an active sweep time $t$ which is one quarter the active horizontal sweep time of the sawtooth wave 214 of the deflection generator 94 for the wide angle display.

Figure 4:
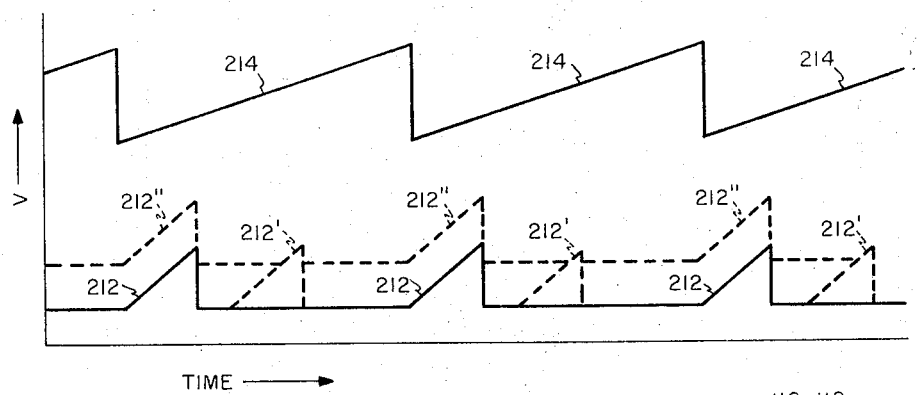
FIG. 4 is a graphic illustration of different conditions of deflection signals utilized in practice of the invention.

When the narrow projection area is wholly within the wide angle area as shown at I, the variable delay means 142 serves to shift the ramps of the modified sawtooth waveform 212 to the right in proportion to the distance L as shown by the dotted line position of the waveform as shown at 212' in FIG. 4. Also, the variable delay means 138 serves to delay the beginning of the vertical deflection signal on line 146 an amount proportional to the distance D. The combined effect of the foregoing is to cause the storage element of a given one of the tubes 110 or 112 to be scanned by the reading beam thereof in synchronism with the scan of the wide angle projection means over the corresponding area I of the screen 18 at which the narrow angle projector is aimed. (For simplicity consider the screen 18 and the wide angle display area B to be congruent.) The image stored in that tube is thereby read into the comparator 210 which produces blanking signals at the correct times to cut out a hole in the background scene in the proper place and of the proper size and shape to accommodate the narrow angle image then being projected as an insert.

Figure 5:
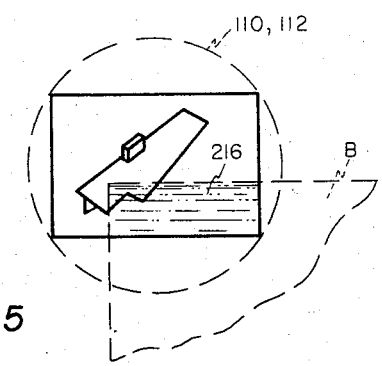
FIG. 5 is a diagrammatic illustration of the scanning relationships of the scan conversion tubes of the computer and generator shown in FIG. 3.

When the narrow angle display falls partly outside the area S as shown at I', then the variable delays 138 and 142 provide zero delays, but the vertical and horizontal deflection signals are offset by voltages on lines 42a, 46a and the action of the summing amplifiers 148, 162. Thus, the modified sawtooth waveform will be offset vertically as shown at 212'' in FIG. 4. The result of this is to cause the reading beams of the graphecon tubes to scan an area 216 (FIG. 5), of the storage element thereof corresponding to the portion of the narrow angle area I' that falls within the screen 18. The scanning of area 216 will, of course, be in synchronism with the wide angle scan of the corresponding area of the screen 18.

Other combinations of the actions of the delay means 138 and 142 and of the summing amplifiers 148 and 162 will correspond to other positions of the narrow angle projection area. Thus, at I'', the variable delay 138 and the amplifier 162 would be effective, while the delay 142 and amplifier 148 would not. Whatever the position of the narrow angle display with respect to the wide angle display, the circuit of FIG. 3 will result in synchronism of the reading beam with the wide angle scan over a corresponding area.

The action of the flip-flop 180 and the associated gates assures that each field of narrow angle display can be used for generating blanking signals for the immediately following wide angle display.

The system described is equally effective for color narrow angle displays as for monochromatic e.g. black and white because the scan conversion tubes will provide image storage in shades of gray for all colors employed.

Although an exemplary blanking signal computer and generator 50 has been described utilizing scan conversion tube means to effect the necessary delays for providing blanking signals in each field based on the narrow angle image of the immediately preceding field, the invention contemplates that the necessary delays for initiation and termination of blanking signals can be computed by digital computer means in conjunction with the computer means used for generating the narrow angle video.

Obviously many modifications and variations of the present invention are possible in the light of the above teachings. It is therefore to be understood that within the scope of the appended claims the invention may be practiced otherwise than as specifically described.

What is claimed is:

1. A composite scene television display system wherein a wide angle background scene is blanked where necessary to accept as an insert a narrow angle, higher resolution computer generated scene, said system comprising:
    wide angle televison projection means utilizing line scanning for displaying said background scene on a screen;
    narrow angle television projection means utilizing line scanning for displaying on a portion of said screen said narrow angle scene as an insert to said background scene;
    means for generating narrow angle video signals for use by said narrow angle projection means;
    said narrow angle projection means being positionable to vary said portion of said screen on which said narrow angle scene is displayed;
    means for providing position signals representative of the position of said narrow angle projection means;
    means for generating horizontal and vertical sync signals for use by said projection means; and
    blanking signal computer and generator means, responsive to said position signals, said sync signals, and to said narrow angle video signals, for computing and generating wide angle video blanking signals whereby a hole is formed in each field of said wide angle scene which will match the shape of the narrow angle scene of the immediately preceding narrow angle field.

2. A composite scene television display system as defined in claim 1, and wherein said blanking signal computer and generator comprises:
    delay means for introducing the delays necessary to initiate and terminate said blanking signals in each wide angle field based on the computer generated narrow angle video signal data of the immediately preceding narrow angle field.

3. A composite scene television display system as defined in claim 2, and wherein said delay means comprises:
    temporary storage means for storing the computer generated narrow angle video signal data of a given field;
    means for reading out said data during the immediately following wide angle field at a rate corresponding to the wide angle scan rate; and
    means for converting said read out data to said blanking signals.

4. A composite scene television display system as defined in claim 3, and wherein:
    said temporary storage means and said means for reading out said data comprise scan conversion tube means.

5. A composite scene television display system as defined in claim 4, and wherein:
said scan conversion tube means comprises first and second scan conversion tubes each of which has a write section and a read section;
means for causing said narrow angle data to be read into said first and said second scan conversion tubes alternately during successive narrow angle fields; and
means for causing said data to be read out from said first and second tubes on successive alternate fields, whereby when one tube is receiving data the other is having data read out and vice versa.

6. A composite scene television display system as defined in claim 5, and wherein said blanking signal computer and generator further comprises:
first horizontal and vertical deflection generators for controlling the deflection of the writing beam of each of said scan conversion tubes so as to scan the storage elements of said scan conversion tubes with full deflection corresponding to the narrow angle projection area;
second horizontal and vertical deflection generators for controlling the deflection of the reading beam of each of said scan conversion tubes, so as to scan said storage elements in synchronism with scan of a corresponding area of the wide angle scene; and
video comparator means for generating a wide angle video blanking signal whenever said read-out from one or the other of said scan conversion tubes is characteristic of narrow angle video.

7. A composite scene television display system as defined in claim 6, and wherein said blanking signal generator and computer further comprises:
first and second variable delay means, responsive to said position signals, for offsetting the outputs of said second vertical and horizontal deflection generators so as to coordinate blanking of said background scene in accordance with the position of said narrow angle projection means.

8. A method of generating a composite, multiple field television display wherein a computer generated narrow angle scene is inserted into a wide angle scene, comprising the steps of:
projecting a wide angle television background scene with a first scanning type television projector;
projecting a computer generated narrow angle television insert scene with a dirigible second scanning type television projector;
sensing the position of said second projector;
temporarily storing data corresponding to one field of said narrow angle scene;
computing from said data and from the sensed position of the second projector the periods in the immediately following wide angle field during which wide angle video must be blanked to accommodate said narrow angle scene; and
blanking said wide angle video during those periods.

9. A method of generating a composite television display wherein a computer generated narrow angle display is inserted into a wide angle scene, comprising the steps of:
projecting a wide angle television background scene with a first scanning type television projector;
projecting a computer generated narrow angle television insert scene with a dirigible second scanning type television projector;
sensing the position of said second projector;
alternatively storing data corresponding to alternating first and second interlace fields of said narrow angle scene;
computing from said data for each narrow angle field and from the sensed position of said second projector the periods in the immediately following wide angle fields during which wide angle video must be blanked to accommodate said narrow angle scene; and
blanking said wide angle video during those periods.

* * * * *